Aug. 16, 1938.                F. SCHMIDT                2,126,707
                         RUBBER AND METAL SPRING
                 Filed Sept. 13, 1937        2 Sheets-Sheet 1

INVENTOR
Fritz Schmidt
BY Harness, Dickey & Pierce.
ATTORNEYS.

Aug. 16, 1938.   F. SCHMIDT   2,126,707
RUBBER AND METAL SPRING
Filed Sept. 13, 1937   2 Sheets-Sheet 2

INVENTOR
Fritz Schmidt
BY
Harness, Dickey & Pierce.
ATTORNEYS.

Patented Aug. 16, 1938

2,126,707

UNITED STATES PATENT OFFICE 2,126,707

RUBBER AND METAL SPRING

Fritz Schmidt, Harburg-Wilhelmsburg, Germany, assignor to Metalastik Ltd., Leicester, England, a British firm Application September 13, 1937, Serial No. 163,638
In Germany January 23, 1936

1 Claim. (Cl. 267—63)

The invention relates to spring constructions in which rubber-metal parts are used, whereby the rubber is vulcanized to the metal, and the adhesive resistance or strength of the connection is equal or superior to the tensile strength of the rubber.

The object of the invention, while using a uniform constructional principle, is to make springs that are adapted to be stressed within wide limits, without hereby subjecting the rubber at any place to an overload that might lead to premature fatigue. A further advantage of the subject of the invention is that the flexibility of the spring in radial directions and in torsion, likewise within wide limits, may be regulated, so that even different requirements in individual cases of application may be fulfilled easily.

The drawings in Figures 1 to 7 illustrate a number of forms of construction of the invention diagrammatically, and all are in longitudinal section through the vertical planes of symmetry.

Figure 1:
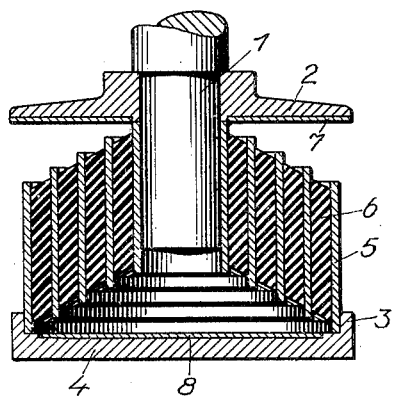

The general basic form of the spring is as a rule of cylindrical, concentric character. Fig. 1 has a pin 1 connected with the part to be rendered resilient, and for the purpose of increasing the pressure area it carries the plate 2. The part serving to take the spring pressure is shown in the drawings as a plate 4 provided with an edge rim 3. The spring formed of rubber-metal parts is disposed between the plates 2 and 4, and this spring may comprise concentrically disposed metal cylinders 5, which are offset stepwise relatively to one another in a vertical direction, and between which rubber masses 6 are disposed and are vulcanized thereto. The pin 1 is inserted into the innermost of these cylinders 5 and may have a tight friction fit therein. Both the lower surface of the plate 2 as well as the upper surface of the plate 4 are covered with suitable rubber layers 7 and 8 respectively, which are likewise vulcanized thereon, and which are for the purpose of quieting noises.

When the spring is under load, the pin 1 and the plate 2 in the first place press upon the upper edge of the innermost of the metal cylinders 5, and because the rubber mass 6 surrounding the same has the least volume in comparison with the masses disposed farther to the outside, the shearing stress that is created in it works the strongest, that is, the axial displacement of the innermost cylinder 5 as compared with the subsequent cylinders is the greatest. As a consequence, the simultaneous displacement of the other cylinders 5 relatively to one another decreases toward the outside, in accordance with the volume of the associated rubber layers 6. With suitable loading by means of the pin 1 or the plate 2, the case will consequently occur in which the metal cylinder 5 situated second from the inside, will bear against the lower side of the plate 2, that is, against the rubber coating 7. The load at which this occurs is naturally related to the allowable maximum stress of the rubber mass employed, which is displaced in the manner described, so that overloading is impossible. If the load is continuously increased, then, in corresponding sections, all the cylinders 5 will one after the other come to bear against the under surface of the plate 2, so that the spring is finally displaced for its entire radial dimension. It is self-evident that the range of action of the spring may be extensively varied, in that the depth and thickness of the separate rubber layers 6, as well as the hardness or toughness of the rubber, may be suitably selected. The rubber may be uniform for all the layers, and it may also vary in a constant or intermittent manner. General characteristics of a spring of the type described are that the flexibility in a radial direction is relatively small as compared with the flexibility in an axial direction or against torsion, because with radial stressing the resistance of the individual rubber layers in an outward direction increases too rapidly, corresponding to the thereby effective pressure surfaces of the separate metal cylinders 5. In contrast to this, an elastic twisting of the spring is effected relatively easily, because the separate rubber layers 6 participate in it in an additive sense. The result therefore is, as a general conclusion, that a spring according to Fig. 1 is elastically soft acting against axial and torsional forces, and elastically hard against radial forces.

Figure 2:
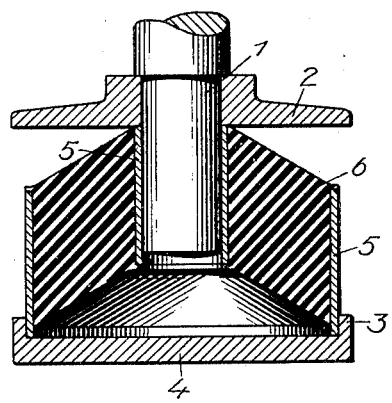

If, contrary to the forms of construction of the invention that have already been dealt with, greater flexibility of the spring in radial directions, similar to the flexibility in the other directions, is to be produced, then the type of construction according to Fig. 2 is suitable. It differs from the type of Fig. 1 only in that the middle metal cylinders 5 are omitted, and only the inner one and the outer one exist, between which the rubber mass 6 is vulcanized in. It is evident without further explanation that the existence of only one metal cylinder with a relatively small pressure surface, the conditions of loading being equal, gives greater flexibility in radial directions. The other actions of this type of construction are similar to those of the previous type, and in particular the spring is put out of action, when the maximum load is reached, through contact of the outer metal cylinder 5 with the lower side of the plate 2. In order to prevent noise, the extension of the rubber mass 6 over the upper edge surface of the outer metal cylinder and lower edge of the inner cylinder is in this case effected for the sake of simplicity.

Figure 3:
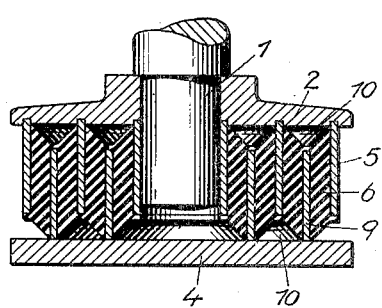
Figure 4:
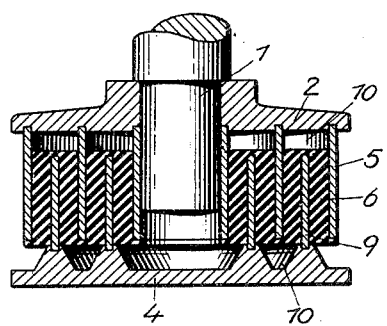

The two forms of construction previously dealt with are principally adapted to a soft action of the spring, and as a result, with a correspondingly compact construction, they are adapted for a not too great load. If large forces are to be transmitted elastically by the spring, then the examples of construction according to Figs. 3 and 4 are to be preferred for this case. Both have basically the same action, and differ only as regards the stress conditions effective in the rubber, which, with purely axial loading, are in the case of Fig. 3 shear-compress stresses, and in the case of Fig. 4 are shear-tension stresses. Considered generally, the groups of metal cylinders 5 and 9 respectively, which are associated in two groups, are so to speak set parallel, so that a hard action may be expected in a radial direction, because in this case there is added together not the elastic flexibility of the rubber, but the resistance to elastic deformation. According to the form of construction of Fig. 3, the one, three, five, and so on metal cylinders 5 are disposed attached to the pressure plate 2 which is under the influence of the pin or shaft 1. Opposite, the two, four, and so on metal cylinders 9, set step-wise opposite to the cylinders 5, rest loosely upon the base plate 4. The rubber mass 6 is vulcanized in between the metal cylinders 5 and 9 in such wise that alternate annular grooves or channels 10 are formed in its upper and lower surfaces in radial sequence with one another.

When axial pressure forces act upon the shaft 1, all the metal cylinders 5 are displaced towards the cylinders 9, and the entire rubber mass 6 is hereby subjected to stress, shear combined with compression. If airtight guidance is provided, the air enclosed in the channels 10 can hereby be employed for elastic cooperation. With this form of construction there is only resistance to radial and torsional forces to the extent of the friction of the lower edge surfaces of the metal cylinders 9 upon the base plate 4. Apart from this, the upper portion of the spring, mainly the rubber-metal part 5, 6, 9, can displace itself freely relatively to the lower part 4.

With Fig. 4 the most noteworthy difference as compared with Fig. 3, apart from what has already been said, is that the metal cylinders 9 are fastened group-wise to the base plate 4, so that free movement of the lower part 4, 6, 9 of the spring is not possible. It follows from this that there is a strong resistance to radially acting forces, while torsional forces are taken up in the same way as with the first form of construction (Fig. 1). The seating of the metal cylinders 5 and 9 in this case, as in the foregoing examples of construction, is made noiseless by extending the rubber mass 6 over the edge surfaces.

By way of example, a spring according to the construction of Figure 1 or 4 could be employed with great advantage for the elastic support of the pivot pin in trucks or bogies of railroad cars, whereby both the vertical load, as well as the rotary movement while negotiating curves, are taken with an elastic reaction.

Figure 5:
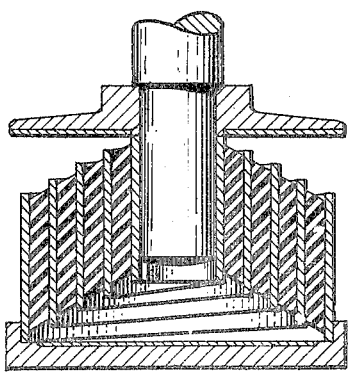

As shown by Fig. 5, instead of concentrically disposed separate metal cylinders 5, a conical spiral spring may also be employed, between the coils of which the rubber mass 6 is disposed and as a rule vulcanized thereto, in uninterrupted sequence. The action of such a spring, as compared with the form of construction previously described, is different to the extent that the metal part in this case takes an elastic part in the spring action or effect, and the work of the rubber is either reinforced or counteracted, whereby an advantageous separate or combined action may be attained in special cases. The latter is for example to be understood in that during the vulcanization of the rubber mass 6 between the coils of the metal spring, this spring is put under a preliminary tension, that is, it is compressed axially to an extent that corresponds to the normal load. In the unloaded state then, the metal spring is not stressed, the rubber on the other hand is so to speak sub-stressed, which works out to being under a tension stress. With normal loading on the other hand, the metal spring is under a corresponding stress, while the rubber on the contrary is unstressed. It is only when there is an increase in the loading that the rubber also becomes stressed, and the tension thereby created, in contrast to the former sub-stressing, may be termed super-stressing, because the shearing stresses change in direction. In this way, both constructional materials may be employed in the best manner in the individual cases concerned.

Figure 6:
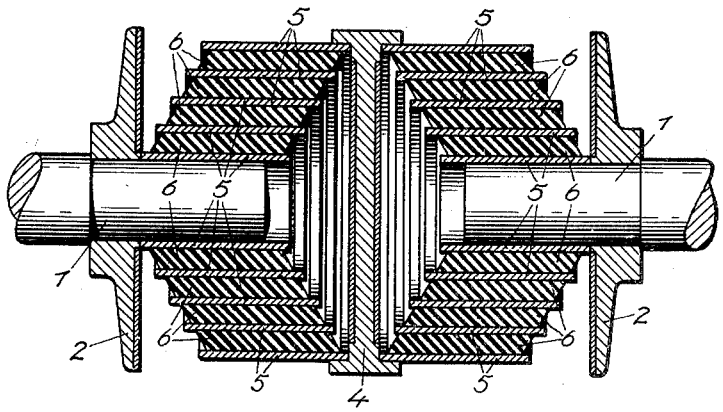
Figure 7:
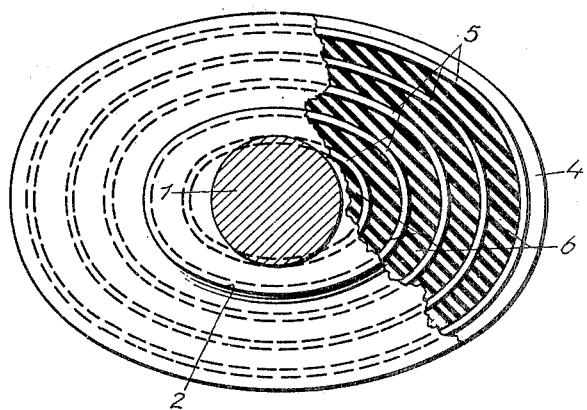

The construction and way of working of the subject of Figs. 6 and 7 are basically the same as with the subject of Figure 1. A pin 1 is fastened to one of the two machine parts that are to be connected elastically, and it carries a pressure plate 2, which at the innermost part of its surface rests upon the innermost of a number of metal cylinders 5 disposed concentrically and step-wise to one another. The rubber mass 6 is in known wise brought in a tightly clinging manner between these cylinders, by the use of adhesive, or by vulcanizing it to them. The outermost of the metal cylinders 5 rests with its lower rim on the base plate 4, which is fastened to the second of the machine parts that are to be connected. For great load pressures, springs of such construction would have to be too great in diameter, which often makes their housing at the place provided for them difficult or impossible.

For this reason, and according to the invention, the separate metal cylinders 5 are not disposed in unbroken sequence concentrically and step-wise relatively to one another. On the contrary, the entire spring is divided into two parts that are similar to each other, and which are fastened to their base plates 4 in a symmetrical position into one plate. Considerable space in diameter is saved by this method, while the length is increased. In order to make the action of the spring according to the present method of construction equal to that of the constructional method shown by Fig. 1, it is necessary to provide the second spring part with rubber of different hardness from that of the first. The number of metal cylinders 5 and their respective spacing may also be chosen differently with the first part than with the second. The middle cylinders of the metal cylinders 5 may moreover be omitted (as in Fig. 2), so that only the innermost and the outermost remain, between which a single thick layer of rubber is put. These variations in the method of construction give the manufacturer sufficient means to take into consideration the conditions for each individual case occurring.

If in a special case the space available for housing the spring is such that with a circular section there is sufficient room in the direction of one diameter, while in the direction of the diameter perpendicular to it there is on the contrary too little room available, then the form of construction shown by Fig. 7 may be employed, if the greatly diminished flexibility of the rubber to torsional forces is for the purposes in view not injurious, or is even desired. In this case the metal cylinders 5 have, instead of circular cross sections, elliptical cross sections, the minor axis of which, with suitable dimensioning, permits of a considerable saving in room in the direction of one diameter of the spring. The metal cylinders 5 may be so disposed concentrically, or may be so dimensioned in their axis ratios, that they stay at the same distance from one another round the entire periphery, or that the distance from the minor to the major axis of the ellipse increases, so that the innermost ellipse's axis ratio shall not vary, or shall vary only slightly from that of the outermost ellipse.

What is claimed is:

In combination, plate members adapted to be moved towards and away from each other, a plurality of concentric, cylindrical bands disposed between the plates with the axis of the bands parallel to the line of relative movement of the plates, means mounting one end of certain of the bands on one plate, means mounting one end of the bands alternating to the first bands on the other plate, the arrangement being such that the other ends of the bands on either plate are normally spaced from the other plate so as to allow movement of the plates towards each other, rubber sleeves between the bands and bonded thereto and extending beyond the end edges of the latter to cover the same, the sleeves also being spaced from the plates to provide spaces at the ends of the sleeves for rubber that may be caused to flow through deformation of the sleeves when the plates are moved towards each other under load, the rubber portions covering the edges of the bands serving as buffers to prevent metal to metal contact upon maximum movement of the plates towards each other.

FRITZ SCHMIDT.